(12) United States Patent
Amir et al.

(10) Patent No.: US 11,765,565 B2
(45) Date of Patent: Sep. 19, 2023

(54) IDENTIFYING A LOCATION OF A PERSON

(71) Applicant: Essence SmartCare Ltd, Herzeliya Pituach (IL)

(72) Inventors: Ohad Amir, Herzliya (IL); Yaron Oppenheim, Herzliya (IL); Jonathan Schnapp, Tel Aviv (IL)

(73) Assignee: Essence SmartCare Ltd, Herzeliya Pituach (IL)

( * ) Notice: Subject to any disclaimer, the term of this patent is extended or adjusted under 35 U.S.C. 154(b) by 826 days.

(21) Appl. No.: 16/432,896

(22) Filed: Jun. 5, 2019

(65) Prior Publication Data

US 2019/0373438 A1    Dec. 5, 2019

(30) Foreign Application Priority Data

Jun. 5, 2018    (LU) ........................................ 100813

(51) Int. Cl.
*H04W 4/90*    (2018.01)
*H04W 4/33*    (2018.01)
(Continued)

(52) U.S. Cl.
CPC .......... *H04W 4/90* (2018.02); *G08B 21/0446* (2013.01); *G10L 15/22* (2013.01); *H04W 4/029* (2018.02); *H04W 4/33* (2018.02)

(58) Field of Classification Search
CPC ......... H04W 4/90; H04W 4/33; H04W 4/029; G08B 21/0446; G08B 21/22; G08B 25/10;
(Continued)

(56) References Cited

U.S. PATENT DOCUMENTS 6,263,311 B1 *   7/2001   Dildy .................... G10L 17/00
                                                 704/247
7,688,679 B2 *   3/2010   Baxter .................... G01S 5/22
                                                 367/128
(Continued)

FOREIGN PATENT DOCUMENTS

EP          2983148 A1    2/2016

OTHER PUBLICATIONS

Foreign Communication from a Related Counterpart Application, Luxembourg Search Report and Written Opinion dated Feb. 26, 2019, Luxembourg Application No. 100813 filed on Jun. 5, 2018.

(Continued)

*Primary Examiner* — Adnan Aziz

(57) ABSTRACT

A location of a person is identified. A controller core is configured for interfacing with a plurality of sensing devices at a plurality of locations. Each sensing device has a sensor for detecting a threat-condition and an acoustic sensor for generating an acoustic indicator indicative of an incident acoustic wave. The controller core is configured to: (i) upon receiving a trigger, instruct wireless transmission to the sensing devices, of a request for an acoustic indicator generated in the sensing device, wherein the request configures each of the sensing devices to activate a process in respect of an incident acoustic wave; (ii) receive one or more of said requested acoustic indicators; and (iii) based on the received one or more acoustic indicators, identify a location of the person (103) within the building.

16 Claims, 5 Drawing Sheets

(51) Int. Cl.
*H04W 4/029* (2018.01)
*G08B 21/04* (2006.01)
*G10L 15/22* (2006.01)

(58) Field of Classification Search
CPC .................. G08B 21/0469; G08B 21/043; G08B 21/182; G08B 25/016; G08B 1/08; G10L 15/22
See application file for complete search history.

(56) References Cited

U.S. PATENT DOCUMENTS

| | | | | |
|---|---|---|---|---|
| 8,866,606 | B1* | 10/2014 | Will | G08B 25/016 340/539.11 |
| 2006/0082455 | A1 | 4/2006 | Andres et al. | |
| 2007/0035402 | A1* | 2/2007 | Dawson | G08B 25/12 340/573.1 |
| 2007/0202927 | A1* | 8/2007 | Pfleging | H04W 4/90 455/567 |
| 2011/0181422 | A1* | 7/2011 | Tran | A61B 5/6824 340/573.1 |
| 2012/0262294 | A1* | 10/2012 | Nikolovski | G08B 21/043 340/565 |
| 2014/0365390 | A1* | 12/2014 | Braun | H04W 4/023 705/325 |
| 2015/0279187 | A1* | 10/2015 | Kranz | H04M 1/6041 340/539.12 |
| 2016/0163168 | A1 | 6/2016 | Brav et al. | |
| 2016/0232774 | A1* | 8/2016 | Noland | G08B 21/0438 |
| 2016/0364963 | A1 | 12/2016 | Matsuoka et al. | |
| 2017/0024839 | A1* | 1/2017 | Klein | H04W 4/029 |
| 2018/0061189 | A1 | 3/2018 | Anand et al. | |
| 2018/0211509 | A1* | 7/2018 | Ramaci | A61J 7/0454 |
| 2018/0228006 | A1* | 8/2018 | Baker | G10L 15/22 |
| 2018/0307753 | A1* | 10/2018 | Guo | G06F 16/638 |
| 2019/0088101 | A1* | 3/2019 | Tunnell | G08B 21/0216 |
| 2021/0063526 | A1* | 3/2021 | Aasen | H04B 11/00 |

OTHER PUBLICATIONS

Foreign Communication from a Related Counterpart Application, European Search Report dated Oct. 25, 2019, EP Application No. 19178268 filed on Jun. 4, 2019.

* cited by examiner

IDENTIFYING A LOCATION OF A PERSON

CROSS-REFERENCE TO RELATED APPLICATIONS

The present application claims priority to Luxembourg Application No. LU100813 filed with the Intellectual Property Office of Luxembourg on Jun. 5, 2018 which is incorporated herein by reference in its entirety for all purposes.

TECHNICAL FIELD

The present invention relates to identifying a location of a person. Some embodiments of the invention more specifically relate to a monitoring system for use in a building and adapted to identify a location of a person in the building.

BACKGROUND

Monitoring systems may be used to monitor an environment, and/or emotional and/or physical condition of a person, in a building. For example, the monitoring system may include one or sensing devices, e.g. motion detectors and/or other sensors, to detect movement of a person. The monitoring system may thus act as an alarm system for intruder detection. The monitoring system may additionally or alternatively include environmental sensors to detect a threatening environmental condition such a fire. Additionally, or alternatively, the monitoring system may be used to track a movement pattern and/or movement history of a resident of building. The sensing devices may include one or more sensing devices for performing such monitoring.

In an event that the monitoring system senses threatening condition, including potentially threatening conditions, the monitoring system may transmit an alert message to a remote server and/or monitoring station, or to just the remote server which may then in turn transmit an alert to the monitoring station. Either automatically, or at the command of an attendant at the monitoring station, there may be dispatched help, e.g. an ambulance for example, to the location at which a processing system in the remote station knows the monitoring system is installed.

However, when the help arrives critical time may be lost trying to locate the person in the building, as the monitored area often monitors multiple rooms of the building. Further the resident needing help may be of weak voice and unable to make a loud enough call to assist arrived personnel in quickly finding them.

The present invention aims to solve, or at least ameliorate, one or more of the above or other problems of the prior art or provide an advantage evident from the description herein.

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

SUMMARY OF THE INVENTION

A first aspect of the present invention comprises a computer-implemented method for identifying a location of a person within a building, the method comprising at one or more processors of a monitoring system:

upon receiving a trigger, instructing wireless transmission, to a plurality of sensing devices of the monitoring system at a plurality of locations distributed in a building, of a request for an acoustic indicator generated in the sensing device, wherein each of the sensing devices has at least one sensor for detecting a threat-condition and an acoustic sensor for generating at the sensing device an acoustic indicator indicative of an incident acoustic wave, and the request configures each of the plurality of sensing devices to wake at least one processing device and activate a process in respect of an incident acoustic wave;

receiving a plurality of said requested acoustic indicators, each acoustic indicator being derived from the activated process;

selecting a subset of the received acoustic-indicators, the selecting of the subset comprising comparing the acoustic indicators to identify at least one of the received acoustic indicators that represents a louder acoustic wave, or a louder component or louder acoustic signature extracted from the acoustic wave, than another of the plurality of received acoustic indicators; and based on the subset of the received plurality of acoustic indicators, identifying a location of the person within the building.

A second aspect of the present invention comprises a computer-implemented method for identifying a location of a person within a building, the method comprising at one or more processors of a monitoring system:

upon receiving a trigger, instructing wireless transmission, to a plurality of sensing devices of the monitoring system at a plurality of locations distributed in a building, of a request for an acoustic indicator generated in the sensing device, wherein each of the sensing devices has at least one sensor for detecting a threat-condition and an acoustic sensor for generating at the sensing device an acoustic indicator indicative of an incident acoustic wave, and the request configures each of the plurality of sensing devices to wake at least one processing device and activate a process in respect of an incident acoustic wave;

receiving one or more of said requested acoustic indicators, each acoustic indicator being derived from the activated process; and based on the received one or more acoustic indicators, identifying a location of the person within the building, wherein a received request from a remote device to identify a location of a person acts as the trigger and the method comprises instructing transmission of the identified location to said remote device.

A third aspect of the present invention provides a computer-implemented method for identifying a location of a person within a building, the method comprising at one or more processors of a monitoring system:

upon receiving a trigger, instructing wireless transmission, to a plurality of sensing devices of the monitoring system at a plurality of locations distributed in a building, of a request for an acoustic indicator generated in the sensing device, wherein each of the sensing devices has at least one sensor for detecting a threat-condition and an acoustic sensor for generating at the sensing device an acoustic indicator indicative of an incident acoustic wave, and the request configures each of the plurality of sensing devices to wake at least one processing device and activate a process in respect of an incident acoustic wave;

receiving one or more of said requested acoustic indicators, each acoustic indicator being derived from the activated process; and based on the received one or more acoustic indicators, identifying a location of the person within the building.

As will be appreciated, advantageously, by the above aspects of the present invention, a location of a person in the building may be determined by using acoustic wave sensors at each of a plurality of locations in the building. Further because the request configures each of the plurality of sensing devices to activate a process in respect of an incident acoustic wave, the sensing devices can avoid constantly running the process, and can thereby save power. This is especially advantageous for embodiments in which one, a plurality or all of the sensing devices are powered only by an internal battery.

The request for an acoustic indicator includes one or more signal transmissions for the waking up of the at least one processing device and for instructing said process. Thus, transmitting a request for an acoustic indicator may involve transmitting a first signal to wake up the at least one processing device and transmitting a second signal to instruct (e.g. command) said process. In other embodiments a single transmission may include wakeup and instruct components. The waking up may switch the at least one processing device from a power conserving mode (e.g. a sleep mode) to an awake mode, wherein the waking of the at least one processor wakes the radio by wake-on-radio or wake-on-beacon techniques.

In some embodiments, the process comprises an analysis the incident acoustic wave, wherein a sensing device receiving the request for an acoustic indicator, in an event that an outcome of the analysis meets a predefined condition, transmits the requested acoustic indicator. The acoustic indicator may, in such embodiments, indicate the outcome of the analysis.

In some embodiments, additionally or alternatively, the acoustic indicator comprises a representation of the incident acoustic wave and said one or more processors analyze the representation to determine an analysis outcome.

In any case, the location of the person in the building is identified based on the outcomes of the analyses of the incident waves at the plurality of sensing devices.

In some embodiments the analysis of each incident wave, whether in the sensing device and/or in the one or more processors, comprises determining whether the incident wave passes a test, wherein the identified location excludes locations at which the incident acoustic wave fails the test.

In some embodiments the passing the test requires is that a measured loudness of the incident wave, or in some embodiments a component or acoustic signature extracted therefrom, is greater than a predefined threshold for at least time window of a predefined duration. In some embodiments the passing the test requires is that the measured loudness of the incident wave is greater than a predefined threshold for at predefined plurality of said time windows. The component or acoustic signature extracted therefrom may be extracted based on a searched-for wave, such as a beacon and or spoken phrase.

In some embodiments, the analysis, whether in the sensing device and/or in the one or more processors, additionally or alternatively comprises analyzing the incident acoustic wave to identify one or more spoken words represented in the acoustic waves, and passing the test additionally or alternatively requires that analysis identifies one or more spoken words. Passing test may additionally or alternatively require that the identified one of more spoken words are indicative of an affirmative response to an audio prompt, wherein the method comprises transmitting the audio prompt from the sensing device. The audio prompt is, in some embodiments, a spoken sentence, preferably a pre-recorded human-spoken sentence, the spoken question being electronically stored in a non-transient memory of the sensing device, which is read to transmit said audio prompt. The spoken sentence may be a question such as "Are you there?", for example.

Optionally, the request to the plurality of sensing devices for an acoustic indicator may be provided in a plurality of temporally sequential signal transmissions, each signal transmission being to a different one of the sensing devices. Thus, for example, the sensing devices may be configured by the signal transmissions to transmit said prompt and listen for a response, cycling through (i.e. polling) the sensing devices, for example, one sensing device at a time.

In some embodiments, the analysis, whether in the sensing device and/or in the one or more processors, additionally or alternatively comprises analyzing the incident acoustic wave to identify whether the incident acoustic wave has a characteristic corresponding to a reference acoustic signature, the reference acoustic signature representing a predefined acoustic beacon, wherein passing the test requires that the characteristic corresponds to a reference acoustic signature.

In some embodiments the reference acoustic signature has a frequency spectrum that is above a frequency spectrum detectable by a human ear. For example, the frequency spectrum may have a lowest frequency that is above 20 kHz. Thus, optionally, a relatively loud beacon may be transmitted from a device worn on the person without irritating the person.

However, in some embodiments, the beacon is transmitted at a predefined loudness and the sensing device is configured to deem detection of the acoustic signature only in an event that the incident acoustic wave is measured to a received loudness greater than predefined minimum, wherein the predefined minimum and predefined loudness set a fixed signature detection range in quiet free space. The detection range may be for example 10 meters in some embodiments or 5 meters in other embodiments.

With such a detection range it may be more likely than sensing devices in the same room as a device generating the beacon detect the signature, while limiting an ability for the number sensing devices in other rooms to detect the signature.

In some embodiments, the identified location corresponds to locations of multiple sensing devices, but wherein the multiple sensing devices is less than said plurality of sensing devices. Thus, the location of the person may be identified as being within a subset of possible locations, wherein each possible location corresponds to a corresponding one of the sensing devices.

In any case, in some embodiments, the method comprises, at a controller core:
  in an event that said received one or more acoustic-indicators comprises a plurality of received acoustic-indicators, selecting a subset of the received acoustic-indicators, wherein the location of the person within the building is identified based on the selected subset. For example, the location may be identified as being in one of one or more rooms wherein each of the one or more rooms correspond to a respective room having installed therein a sensing device from which one of the one or more selected acoustic indicators was received.

In some embodiments, a loudness of incident wave and/or of an aspect of an incident wave is used to narrow the possible areas in which the person may be located. For example, selecting a subset of the received acoustic-indicators may comprise comparing the acoustic indicators to identify one or more of received acoustic indicators that represent a louder acoustic wave, or a louder component or louder acoustic signature extracted from the acoustic wave, than is represented by another of the plurality of received acoustic indicators, and selecting said identified one or more acoustic indicators. The component or acoustic signature extracted therefrom may be extracted based on a searched-for wave, such as a beacon and or spoken phrase.

The method may comprise selecting a specific one of the received acoustic indicators. Thus, identifying a location of a person comprises identifying a specific one location in the building at which a person is determined to be located.

For example, the selection may comprise comparing the acoustic indicators of the plurality of received acoustic indicators to identify one of received acoustic indicators that represents loudest expected acoustic wave amongst the plurality of received acoustic indicators.

The loudness may be measured as a loudness of the incident wave or of an extracted component of the incident wave, eg. an extracted acoustic signature. The extracted acoustic signature may for be extracted for comparison with an acoustic reference (e.g. for determining whether the acoustic wave originated from a person and/or beacon).

The loudness may be determined as, for example, a root mean square of a representation of the incident acoustic wave defined by the acoustic indicator. As will be appreciated loudness may alternatively be characterized and/or calculated in other ways.

The identified location may be defined by one or more identifiers (e.g. a hardware identifier, such as a serial number, for example) corresponding to a respective one or more of the sensing devices. For example, the location may be identified as the hardware identifier of one of the sensing devices. Thus, an actual room or other spatial reference need is not known in some embodiments, but in other embodiments a hardware identifier of is translated to spatial reference, such as a room name for example, at which the sensing device having that serial number is recorded to be located.

In some embodiments, the trigger is a receipt of a threat alert in a radiofrequency signal received by a wireless communication channel for communicating with a device in the building.

For example, the safety-threat alert may be from one or more of the sensing devices. In some embodiments, the alert is a signal indicative of at least one of: a fall detection event; a voice-activated distress call event; and a distress button (also known as panic button) press event; and a distress chord pulling event.

In some embodiments the safety-threat alert may is from a wearable personal safety device worn on the person and configured for one or more of: detecting a fall and receiving a distress response from the person (e.g. by means of a panic button). In some embodiments the personal safety device, in addition to transmitting the safety alert, transmits an acoustic beacon, preferably with a predefined periodicity. The beacon may advantageously have said acoustic signature.

In some embodiment the trigger may be a received request from a remote device (e.g. a server or monitoring station) to identify a location of a person. Thus, the request may be received via a telecommunications network.

The method may comprise, at the controller core, instructing transmission of the identified location to a remote device, which in some embodiments, is said remote device from which a request to identify a location of a person was received.

As will be appreciated, by providing the remote device with the identified location personnel arriving at the building to assist the person can more quickly find the person in the building. Further, in some situations an alert to the remote device may have been based on a detected event by a sensing device at one location, which may in some circumstances indicate an initial location of the person at the time that the alter was sent. However, it is possible that the person may move from that initial location. Thus, by the time assistance arrives at the building it may be advantageous to trigger method of identifying the location of the person, so that a current location may be determined.

In some embodiments, the controller core is a control panel of a monitoring system, the monitoring system including the plurality of sensing devices.

In other embodiments, the controller core comprises:
  a control panel of a monitoring system, the monitoring system including the plurality of sensing devices; and
  a server;
    wherein the one or more processors comprises are a plurality of processors distributed amongst the control panel and the server.

The server may comprise be a distributed server.

In some embodiments of the present invention, the instruction of the request for an acoustic indicator, and the receipt of the one or more of said requested acoustic parameters occur at a common one or more of said one or more processors. For such embodiments, the common one or more of the processors are preferably in a control panel of the monitoring system.

In other embodiments, however, a sensing device of the monitoring system, which detects an alert condition, instructs the transmission of the request for an acoustic indicator. The one or more acoustic indicators is preferably, however, received by the control panel in such embodiments. The trigger in such embodiments is the detection of the alert condition by the sensing device.

Preferably the transmissions instructed by the one or more processors of the controller core are transmissions from one or more radio frequency antennas of the controller core. The transmission of the request to the plurality of sensing devices may be, for example, a broadcast request for all of the sensing devices, different requests to different sensing devices, or a request which when received by recipient sensing device, is relayed by the recipient sensing device to another of the sensing devices.

In some of the embodiments at least one of the sensing devices is a sensing device for detecting a threat-condition by sensing any one or more or all of: a fall detection event; a voice-activated distress call event; and a distress button (also known as panic button) press event; and a distress chord pulling event.

A fourth aspect of the present invention provides a controller core having one or more processors that configure the controller core to execute a method in accordance with any of the above aspects of the present invention.

Thus, for example, in the fourth aspect of the present invention, there is provided a controller core configured for interfacing with a plurality of sensing devices at a plurality of locations distributed in a building, wherein each of the sensing devices has at least one sensor for detecting a threat-condition and an acoustic sensor for generating in the sensing device an acoustic indicator indicative of an incident acoustic wave, the controller core having one or more processors configured to:
  upon receiving a trigger, instruct wireless transmission to the plurality of sensing devices, of a request for an acoustic indicator generated in the sensing device, wherein the request configures each of the plurality of sensing devices to activate a process in respect of an incident acoustic wave;

receive one or more of said requested acoustic indicators; and based on the received one or more acoustic indicators, identify a location of the person within the building.

Each of the embodiments of the first second and/or third aspects of the present invention may also apply to the fourth aspect of the present invention, unless such application is evidently not relevant.

A fifth aspect of the present invention provides a non-transient computer readable medium storing a plurality of instructions for controlling an electronic system to perform the method according to the first, second and/or third aspect of the present invention.

Thus, for example, in the fifth of the present invention, the electronic system may, for example, be a controller core configured for interfacing with a plurality of sensing devices at a plurality of locations distributed in a building, wherein each of the sensing devices has at least one sensor for detecting a threat-condition and an acoustic sensor for generating in the sensing device an acoustic indicator indicative of an incident acoustic wave, the controller core having one or more processors configured by the plurality of instructions to:

upon receiving a trigger, instruct wireless transmission to the plurality of sensing devices, of a request for an acoustic indicator generated in the sensing device, wherein the request configures each of the plurality of sensing devices to activate a process in respect of an incident acoustic wave;

receive one or more of said requested acoustic indicators; and based on the received one or more acoustic indicators, identify a location of the person within the building.

Each of the embodiments of the first, second and/or third aspects of the present invention may also apply to the fifth aspect of the present invention, unless such application is evidently not relevant.

A sixth aspect of the present invention comprises a sensing device for detecting a threat-condition by sensing any one or more of a fall detection event; a voice-activated distress call event; and a distress button (also known as panic button) press event; and a distress chord pulling event, the sensing device having an acoustic sensor and a processor for processing an acoustic signal from the acoustic sensor, wherein the sensing device is configured to, upon wirelessly receiving a request for an acoustic-indicator, activate a process in respect of an incident acoustic wave, said process comprising:

transmitting, via a speaker, an audible sentence to the prompt a person in the vicinity of the sensing device to reply an answer;

for a predefined time window, acquiring an acoustic signal, using the acoustic sensor and processor, to capture the answer, and transmit an acoustic-indicator based on said acoustic signal.

A seventh aspect of the present invention comprises a sensing device for detecting a threat-condition by sensing any one or more of a fall detection event; a voice-activated distress call event; and a distress button press event; and a distress chord pulling event, the sensing device having an acoustic sensor and a processor for processing an acoustic signal from the acoustic sensor, wherein the sensing device is configured to, upon wirelessly receiving a request for an acoustic-indicator, activate a process in respect of an incident acoustic wave, said process comprising:

for a predefined time window, acquiring an acoustic signal, using the acoustic sensor and processor; and determining whether acoustic signal has an acoustic signature correlated with a reference acoustic signature; and transmitting an acoustic-indicator based on said acoustic signal.

As will be appreciated features of the sensing device described in relation to the first, second and/or third aspects of the invention may also be applied to the sixth and/or seventh aspects of the present invention. For example, each of the sixth and seventh aspects of the present invention, the sensing device in some embodiments powered from an internal battery and not a mains power supply. As another example, the sensing device may, upon receiving the request for an acoustic-indicator, wake a processor from a power conserving mode.

An eighth aspect of the present invention provides a system comprising:

a controller core; and a plurality of sensing devices for operation a plurality of locations distributed in a building, each of the sensing devices having at least one sensor for detecting a threat-condition and an acoustic sensor for generating in the sensing device an acoustic indicator indicative of an incident acoustic wave; the controller core being for interfacing with the plurality of sensing devices, the system being configured to, in use, perform the method according to the first, second and/or third aspects of the present invention.

Each of the embodiments of the first, second and/or third aspects of the present invention may also apply to the eighth aspect of the present invention, unless such application is evidently not relevant.

The controller core may be a controller core according to the fourth aspect of the present invention. One or more or all of the sensing devices may be a sensing device in accordance with the sixth and/or seventh aspects of the present invention.

As used herein, except where the context requires otherwise, the terms "comprises", "includes", "has", and grammatical variants of these terms, are not intended to be exhaustive. They are intended to allow for the possibility of further additives, components, integers or steps.

Various embodiments of the invention are set out in the claims at the end of this specification. Further aspects of the present invention and further embodiments of the aspects described in the preceding paragraphs will become apparent from the following figures and description, given by way of non-limiting example only. As will be appreciated, other embodiments are also possible and are within the scope of the claims.

DETAILED DESCRIPTION OF THE EMBODIMENTS

Figure 1:
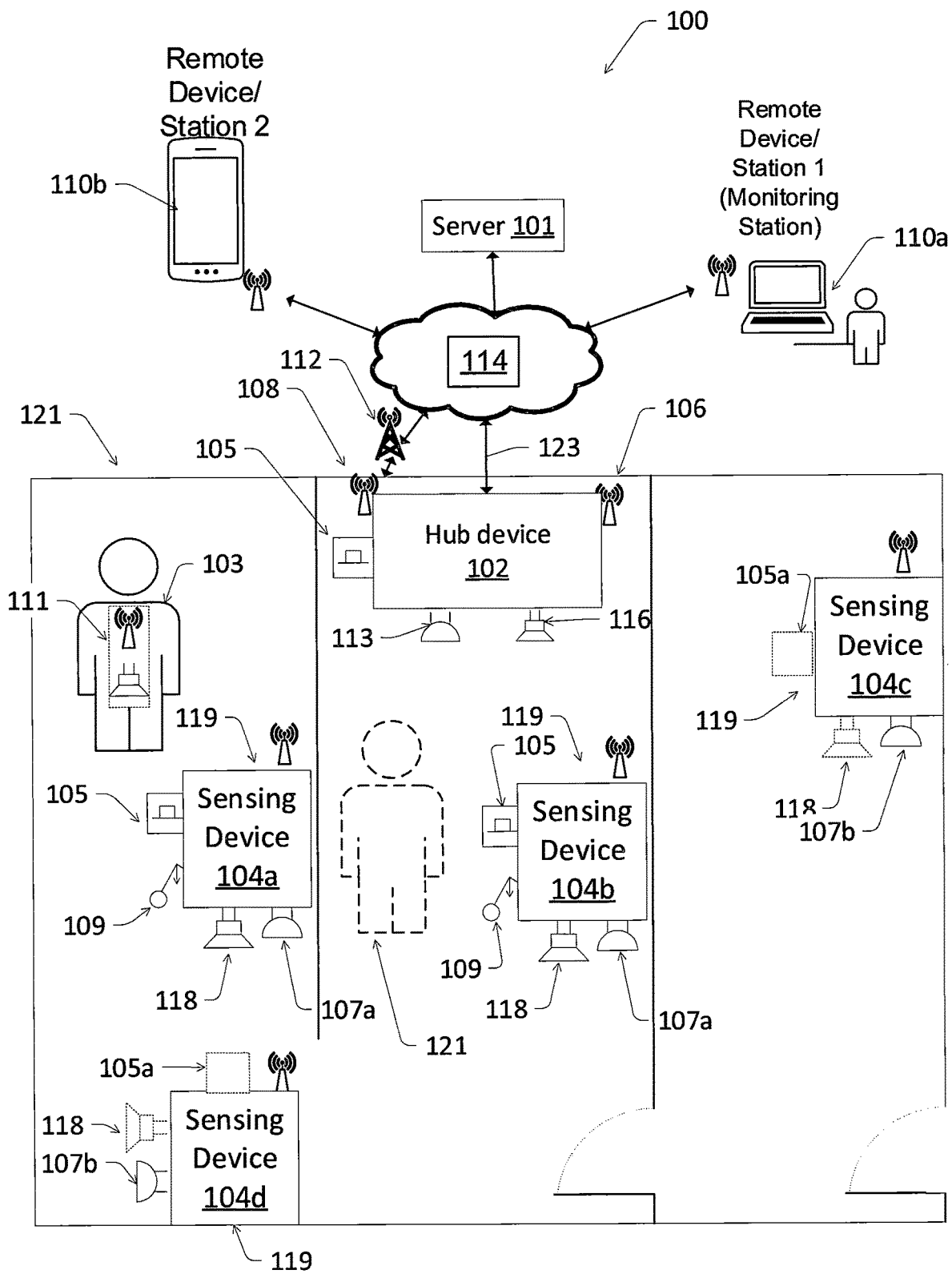
FIG. 1 is a block diagram depicting an exemplary system in accordance with one or more aspects of the present invention, the system being monitoring one or more spaces.

An exemplary embodiment of a system 100 in accordance with an aspect of the present invention is illustrated in FIG. 1. In this example the system is a monitoring system that includes sensing devices for monitoring a plurality of spaces (e.g. 2 or more rooms, and in some embodiments 3 or more rooms) within a building 121. The system 100 has a hub device 102 in the form of a control panel that provides central control of, and data collection from, a plurality of peripheral sensing devices 104(a-e) (also referred to herein as "sensing devices" or "peripheral devices") by RF communication, in a first frequency band, using a local-communication antenna 106 on the control panel 102. The sensing devices 104(a-e) are stationary locations in the building 121.

The peripheral devices may include one or environmental sensing devices 104(c,d), each having one or more sensors 105a for detecting an environmental condition indicative of a threat (including potential threat) to the person 102 in a particular part (e.g. room) of the monitored space(s) in the building 121. Such peripheral devices may be or include, for example, passive infrared sensors (PIRs), motion sensors, sensors for detecting changes in a state of a door or window, temperature sensors, smoke sensors or any other sensor for measuring and/or detecting an environmental condition. The other peripheral devices may alternatively be any other smart device for assisting living, including a smart TV, one or more lights, an air conditioning or heating system a hi-fi sound-system, and the like.

The person 103 may be someone for whom monitoring is desirable or necessary. For example, the person 103 may be an elderly or infirm person, and the environment in which they are monitored may be a home residence, in which there may rarely, or at least not always, be another person present to see that the person 103 is safe and well.

The system 100 provides an ability for the person 103 to send an alert to a remote device/station 110(a,b) indicating a threat to their safety, which may be an environmental threat or a threat to their health or mobility. For example each of the control panel 102 and the peripheral devices 104(a,b) may include a distress actuator (e.g. a panic/distress button) 105 and may include a microphone 107a, 113 for detecting a spoken call for help or other spoken indication of distress, or a threat-indicative sound. A microphone 107b and in some embodiments a speaker 118 may also be included in one or more of the other peripheral devices 104(c,d) and in some embodiments more particularly in one or more of the peripheral device 104(a,b). Additionally, the hub device 102 may have a microphone 116.

In any case at least a plurality of the sensing devices 104 in different locations 119 in the building 121 include an acoustic sensor and in some embodiments a speaker. In other embodiments the acoustic sensor is a microphone. However, the acoustic sensor in some embodiments has an acoustic range beyond sound waves, e.g. it may be an ultrasound sensor in some embodiments, for example to detect a beacon (as will be described) which may be beyond the range of human hearing and may in some embodiments be an ultrasound wave.

The peripheral devices 104(a,b) may alternatively (but in the exemplary embodiment described herein, additionally) each comprise distress actuators including a pull chord 109 which can be used instead of or in addition to panic button 105 to trigger the sending of an alert. Because of the ability of the exemplified peripheral devices 104(a,b) to trigger an alert by voice or a panic actuator (button or chord) it is convenient to herein refer to the peripheral devices 104(a,b) as voice panic detectors (VPDs). However, it will be appreciate that the peripheral devices 104(a,b) may in other cases take other forms or have additional or alternative functionality to panic detection. One or more or all of the panic detection features of the VPDs may in some embodiments also be included in the hub device 102.

The peripheral devices 104(a,e) communicate messages to and from the control panel 102, by radio frequency (RF) communication, and thus the control panel 102 has one or more RF antennas 106 for the such local-communication. Using one or more of the RF antennas 106 the control panel is also able to receive alerts from a portable, body-worn personal emergency device 111 which includes fall-detection and distress detection worn on the person 103. Distress detection is achieved by means of distress/panic button. Optionally, the portable personal emergency device may additionally or alternatively detect other personal emergencies based on medical/health parameters, e.g. heart rate, for example. In some embodiments, in which the personal emergency device 111 detects is equipment with at least fall and distress detection, the personal emergency device 111 may advantageously be a pendant. In other embodiments personal emergency device 111 may take the form of any other portable device which may be worn on a person in a manner that is easily accessible, including on the wrist.

During use of the portable emergency device 111, in an event that a safety-threat condition is detected/sensed by the portable emergency device 111, the portable emergency device 111 transmits an RF alert which is sensed the hub device 102. Upon receiving the alert, the hub device 102 may transmit an alert signal to the server 101, which acts as needed, e.g. by transmitting a corresponding alert signal to one or both of the monitoring devices/stations 110(a,b). In some embodiments the corresponding alert signal includes an account record with such personal details of the person 103 (or a reference to a previously transmitted record) is transmitted from the server 101 to monitoring station 110(a), which is a computing device. The personal details may include their name, address, age, medical history etc.

The control panel 102 has a second antenna 108 that in some embodiments is used for the communication with one or more remote stations 110(a,b) and/or a distinct server 101, the communication via the second antenna being an RF communication via a telecommunications tower 112 and telecommunications network 114.

In alternative embodiments monitoring station 110a acts as a server for the hub device 102. However, in any case, the acting server has a component that acts as an application server and a component that acts as a storage server. As will be appreciated these server functions may be provided by single computing device or a distributed system. The server includes one or more non-transient computer readable mediums for storing the database and for storing instructions for configuring operation of the server by executing of the instructions by one or more processors.

The storage server stores personal details about the person 103 being monitoring by the home monitoring devices. The application server component interfaces with the hub device 102 to control the home monitoring, and the application server may be accessed from either or both of the remote stations/devices 110(a,b) to enable control therefrom or to provide access to information, such as the person's details, relevant to the monitoring system.

The remote device/station may be a monitoring station 110(a) at which one or more people administer surveillance and responses to the surveillance, when necessary. For example, the monitoring station may be forwarded the indication of safety threat by the control panel 102, and in response a person may dispatch security personnel or an ambulance, depending on the personal details retrieved from the server 101. Another remote device/station may be provided in the form of a personal computing device 110b, such as a laptop, notebook, desktop, tablet, smartphone or the like. The personal computing device may be operated by a person such as a family member or carer of the person 103.

Figure 2:
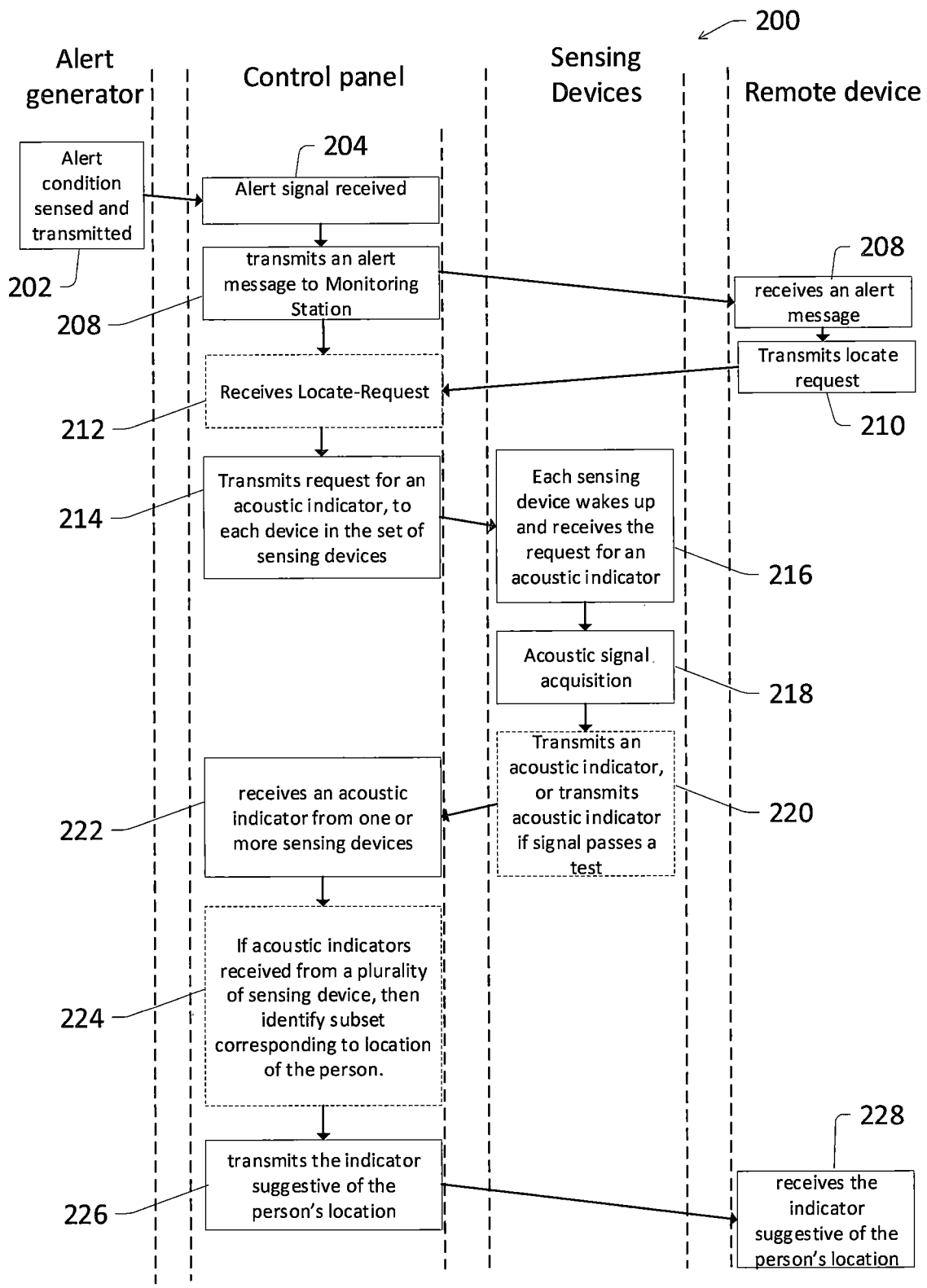
FIG. 2 is a swim lane diagram for exemplary method for identifying a location of person, which may be implemented using the system of FIG. 1.

A swim lane diagram for exemplary method 200 for identifying a location of person 103 using system 100, is illustrated in FIG. 2. At step 202 an alert is generated by a device in the monitoring system 100, such one of the sensing devices 104(a-e) or personal emergency device 111, by transmitting an alert message, which is received by the control panel 102 at step 204. At step 206 the control panel transmits an alert to a remote device such as server 101 and/or monitoring station 110a and/or 110b. In some embodiments, the transmission is to the server 101 which in turn transmits an alert to the monitoring station 110a.

The remote device, exemplified hereinafter as server 101, receives the alert messages at 208 and in response transmits a locate request to the control panel 102. The locate request may also be triggered by other events such as a request received by the server 101, from monitoring station 110a.

At step 212 the control panel receives the locate request and in response transmits, to each of the sensing devices, a request for an acoustic indicator. In other embodiments, the transmission of the request for an acoustic indicator may be an automatic response to receiving a trigger at step 204 from personal emergency device 111.

To conserve power each of the sensing devices 104, which are battery operated, is in a sleep mode in which a processor e.g. a microprocessor or microcontroller of the sensing devices part of its operational functions disabled. In the event of the microphone 107 being an analog microphone, the signal output of the microphone is not processed by the processor in sleep mode. In embodiments where the microphone is a digital microphone at least some processing of any incident acoustic wave is processed internally to the microphone, which consumes more power than the analog microphone. Therefore in addition to the microprocessor/microcontroller being in sleep mode it is also advantageous for the digital microphone to be in a sleep mode or switched off. If there is an analog microphone, it too may be switched off. In any case, at least one processing device for processing incident waves does not engage in such processing when in the sleep mode.

However, the acoustic indicator request transmitted at step 214 has a component which wakes up the recipient sensing device 104, activating the processing component(s) to execute a process in respect of an incident acoustic wave. The component may for example be a long-preamble, waking up the sensing device based on wake-on-radio, or for synchronized embodiments, may be an RF beacon for waking up the sensing device based on wake-on-beacon. Thus, at step 216, the recipient sensing device wakes up, thereby powering-on the processing component(s) to acquire a signal output from the microphone 107 at step 218 for a time period having a predetermined maximum.

During the time period the sensor device listens to determine whether it can "hear" an acoustic wave that is indicative of a human. The acoustic wave it is listening for is in some embodiments a human voice, and in some embodiments certain words.

In some embodiments, the predetermined maximum time period for the signal acquisition is less than 30 seconds, in some embodiments less than 10 seconds. In some embodiments the time period is additionally more than 1 second, especially in, but not limited to, embodiments involving acquisition of voice. In some embodiments the captured acoustic signal is then transmitted at step 220 to the control panel 102. In some embodiments, the sensing device conducts a test on the acquired signal, and step 220 only occurs from a given sensing device is the acquired signal passes a test. For example, the test may be determining whether the acquired signal, or an extraction therefrom, has a loudness greater than a predefined threshold.

In embodiments that test is not conducted at the sensing device, it may be conducted in the control panel 102, wherein signals that do not pass the test are disregarded. Included in or associated with any acoustic indicator transmitted from the sensing device is an identifier (e.g. a serial number) of the sensing device so that the control panel is able to determine which sensing device the signal came from.

In any case, in embodiments in which the threshold test is performed, whether in the sensing device or in the control panel, the threshold is in some embodiments, set relatively low so as only disregard signals due to what is expected to be noise.

Figure 3:
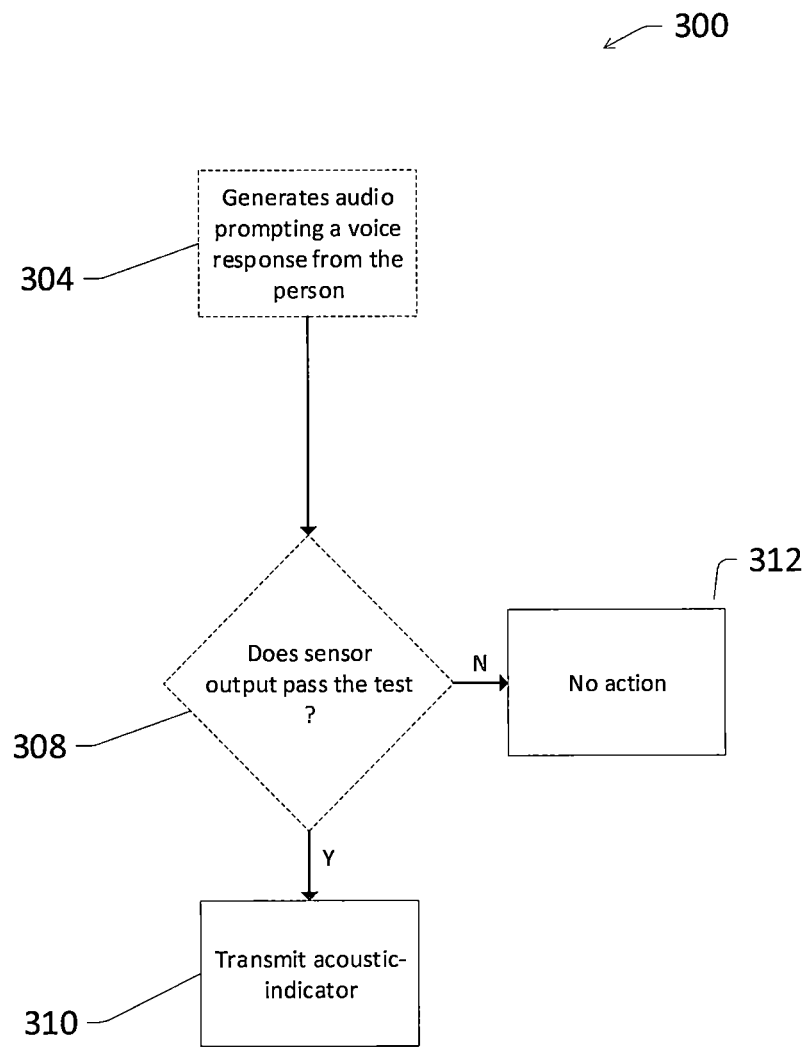
FIG. 3 shows a flow diagram illustrating an exemplary method of acquiring an acoustic indicator for the method of FIG. 2.

FIG. 3 shows a flow diagram illustrating an example 300 of such an embodiment. At step 304 the sensing device receives, in response to receiving the request for an acoustic indicator, generates an audio prompt to trigger a voice response, but more preferably a specific selection of verbal responses. For example, the voice prompt is in some embodiments, pre-recorded messaged asking "Are you there?" A person relatively close to the given sensing device 204 and is expected to give a positive answer, such as "Yes" or Yeah" or some other verbal affirmative response. The sensing device at step 308 analyses the audio signal to identify is if any words are spoken, in as discussed above, preferably a predefined set of words is searched for (e.g. less than 20 in any given language in some embodiments, and less than 5 in some embodiments). If no such words are identified then not action is taken (at 312). However, if such words are identified than at step 310 an acoustic indicator is transmitted to the control panel 102. The acoustic indicator may be only that the test was passed in which case a mere acknowledgement of acoustic indicator may act as the acoustic indicator (a binary acoustic indication in this case, wherein a received indicator is a 1 and a non-received indicator is a 0). However, in some embodiments the acoustic indicator includes a representation of the acquired signal or measurement or extraction thereof (e.g. a portion of the acquired signal that corresponds to the identified word(s)). In some embodiments, rather than conducting the test in a processor of the sensing device 104, the sensing device transmits the acquired signal or a relevant portion thereof, to the control panel 102 for the test to be conducted by the control panel instead.

Returning to FIG. 2, at step 222, the control panel 102 receives each transmitted acoustic indicator. And in embodiments where the aforementioned test is not performed in the sensing device, it may in some embodiments be performed in the control panel 102. After the test, wherever it is performed, the control panel 102 is left with a set of identifiers corresponding to respective sensing devices at which the test was passed.

For example, the control panel may, regardless of where the test is performed, receive (or at least listen for) responses to the request for an acoustic indicator from each of the sensing devices in the monitoring system to which the request for an acoustic indicator was sent. Based on the received responses the control panel 102 derives the set of identifiers corresponding to respective sensing devices for which the test was passed.

With the sensing devices spread amongst a plurality of rooms, the number of sensing devices corresponding to that set of sensing devices at which the test was passed will generally be less than the total number of sensing devices that received the acoustic indicator request, with this effect generally increasing with an increase in the number of rooms being monitored. For example, in monitoring four rooms, the set of identifiers will generally be able used to infer that the location of the person 103 is a particular portion of the total monitored area, the portion for example the room(s) in which sensing devices corresponding to those sensing devices are located. Further in some applications of the identification of the location of the person need not identify a part of the building, but rather just identify the relevant sensing device identifier(s) to which the person is proximal.

The identifiers or names corresponding to those identifiers are transmitted from the control panel 102 to the server at step 226 and is received by the server at step 228. Based on the identified location, the server initiates certain action based on the identified location. For example, the server may look up room names mapped to the identifier(s) and inform arriving emergency personnel of which rooms(s) to search to find the person 103.

In some embodiments the above test is not performed, while in other embodiments it is performed but there remains a desire to further narrow the number of sensing devices in the identified set for a more precise location identification. Thus, at step 224, the signals from the sensing devices in the set (or the signals from all of the sensing devices, if no such set was created) are compared to determine which are louder and/or quieter than the others, wherein sensing devices corresponding to the louder signals remain as identified locations and sensing devices corresponding to quieter signals are disregarded. In some embodiments a single loudest signal is identified so that a signal sensing device is located.

Figure 5:
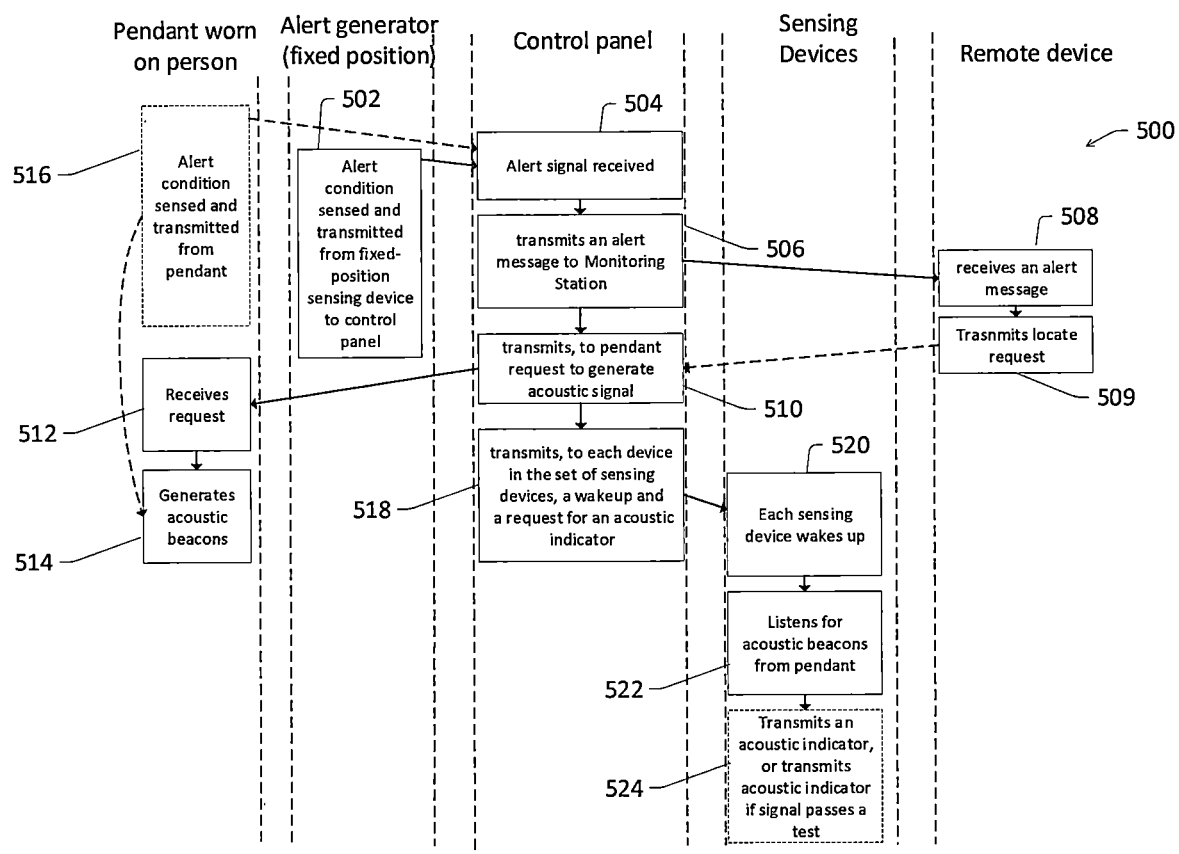
FIG. 5 is a method of acquiring an acoustic indicator which may be used to identify a location of a person in accordance with one or more aspects of the present invention.

Steps 202 to 220 of method 200 may in another embodiment of the invention be replaced with steps 502 to 524 of the exemplary 500 in FIG. 5. As in method 200, the control panel receives an alert signal (step 504) from a sensing device 104 (step 502) at stationary locations in the building 121. At step 506 an alert is transmitted from the control panel 102 to the remote device 101.

At step 510 the control panel 102 transmits a request to a personal emergency device 111 worn on the person 103 to transmit an acoustic beacon. At step 512 the personal emergency device 111 receives the request. In some embodiments the personal emergency device has a processor in a sleep mode that wakes up from a sleep mode as a result of the request (e.g. in the same wake-up manner as described above). In any case at step 514, the personal emergency device 111 transmits an acoustic beacon, the beacon having a known signature, e.g. pulse at a known periodicity, or some other identifiable signature.

At step 508 the remote device receives alert message and optionally, like in FIG. 2, may reply with a locate request, at step 509, to the control panel or may issue a locate request in response to an external input such as a request for a location by monitoring station 110a. In embodiments where a locate request is transmitted the reception of the request by the control panel is another way to trigger the control panel to request a beacon from the personal emergency device (step 510).

In another embodiment, in an event that the personal emergency device 111 worn on the person 103 (step 516) issues an alert to the control panel 102, the personal emergency device 111 automatically starts generating the beacon. In this case, the beacon request at step 510 is redundant.

In any case, the control panel 510 after receiving the alert (or after sending the beacon request, in embodiments in which beacon generation is not automatic), the control panel transmits a request for an acoustic indicator at step 518, which wakes up the sensing devices 104 in the same manner as the corresponding steps 214 and 216 of method 200. In method 500, however, no voice input is required from the person 103. Instead, at step 504, the sensing devices 104 listen for the beacon for a predetermined about of time. The acquired signal may then be tested in the same manner as described above, in the sensing device 104 or in the control panel 102. The beacon signature is known to the sensing device, so the test may advantageously involve extracting/filtering the acquired signal to a frequency band corresponding to the beacon.

The sensing device 104 then transmits an acoustic indicator if the test is passed, or if the test is to be conducted in the control panel, an acoustic indicator is transmitted to provide the control panel with captured signal or extraction therefrom.

Optionally method 500 may be performed in parallel with steps 202 to 220 of method 200, whereby either the person's response or a sensed beacon is required to pass the test. For example, if is either the test according to step 220 or the test according to step 524 is passed then the combined test is considered to be passed.

Figure 4:
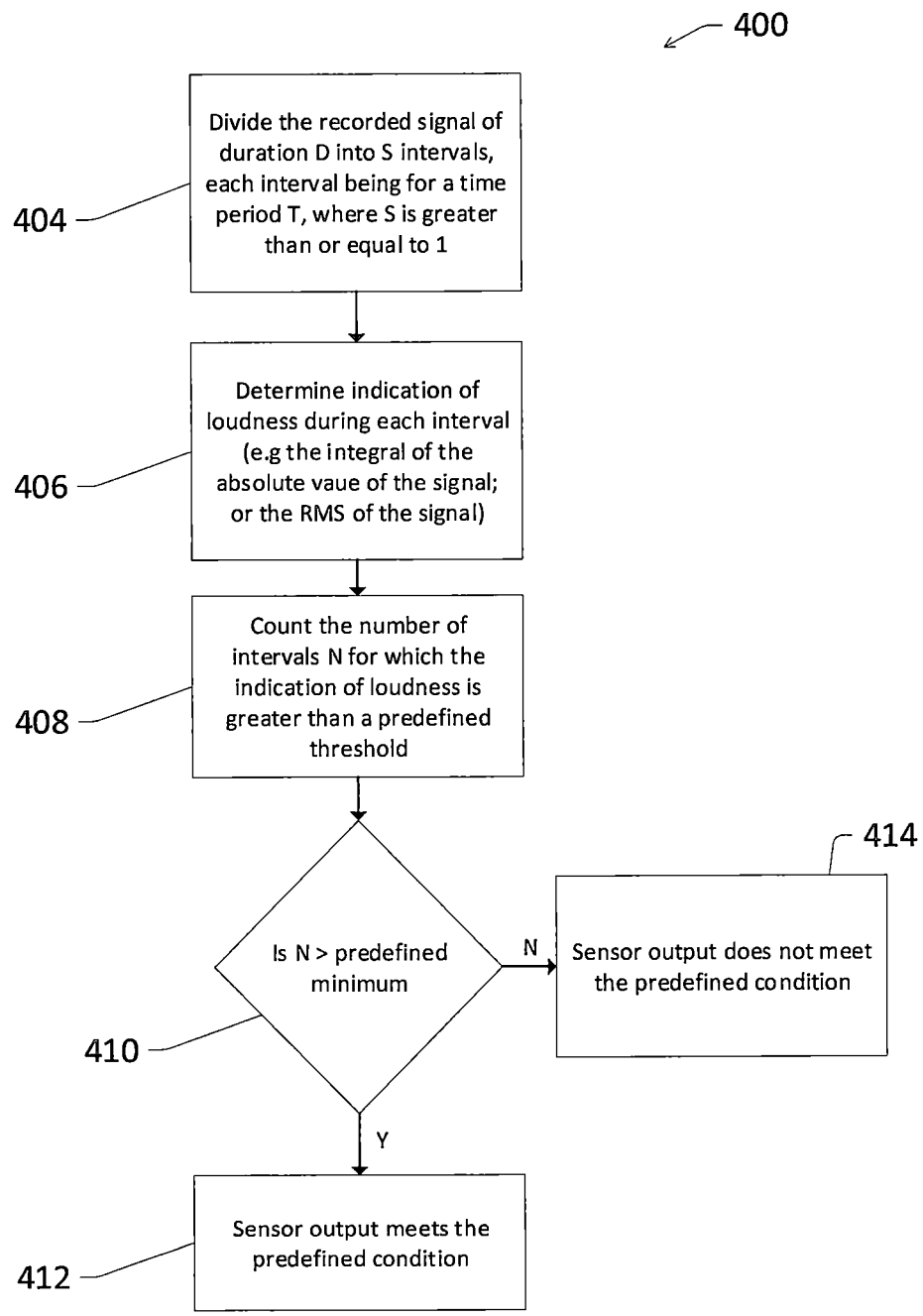
FIG. 4 shows a flow diagram illustrating an exemplary method measuring loudness and/or testing a signal for the method of FIG. 2.

The testing phase of a given signal (measured acoustic wave), whether performed in each sensing device 104 or in the control panel 102, may additionally or alternatively include a requirement that the given signal meets a minimum loudness test. An exemplary minimum loudness test 400 which may be used for this purpose is exemplified in FIG. 4. At step 402, the signal having, acquired for a duration D, is divided into S time intervals/segments, such that there is at least one segment. Each segment lasts a time period T. In some embodiments S is between 50 and 100. In some embodiments, the T is 5 seconds and the S=100.

At step 406 an indication of the loudness for the/each time interval is calculated. The loudness may for example be determined as the integral of the absolute value of the signal, or the RMS of the signal, over the time period. At step 408, the processor executing the test determines the number N of time periods for which the loudness is counted, and is compared with a predefined minimum at step 410. If N is less than or equal to the predefined minimum, the loudness test is determined to have failed (at 414). If N is greater than the predefined minimum, the loudness test is determined to have passed (at 412).

The method 400 may also be used to measure loudness, e.g. as being the average of the determined loudness indications, or in other embodiments, the average of the determined loudness indications that are greater than the predefined minimum. Such a determination of loudness may, for example, be used in step 224 to determine a loudest signal, of all received acoustic indicators.

In some embodiments in which a plurality of people may be in different parts of the monitored space, the control panel may in some embodiments identify a plurality of locations corresponding to a respective different people, e.g. by recognizing different voices or different acoustic beacon signatures. The control panel may for example determine a loudest acoustic indicator, or a set of louder received acoustic indicators, amongst the received responses from the sensing devices in respect of received acoustic indicators comprising a first signature, and determine a loudest acoustic indicator, or a set of louder received acoustic indicators, amongst the received responses from the sensing devices in respect of received acoustic indicator comprising a second signature. In some embodiments, the signatures may be defined so that a given acoustic indicator may comprise only one of the first and second signatures, while in other embodiments the signatures may be defined so that a given acoustic indicator may comprise the first and/or the second signatures. In some embodiments, the control panel may determine that there is more than one signature based on first and second received signals having a measured correlation to each other than is less a defined threshold. In other embodiments first and second signatures may have respective characteristics that are predefined.

Some or all of the calculations performed by the control panel 102 in the exemplified methods may in alternative embodiments determined by a server, such as server 101 with which the control panel 102 is in direct or indirect communication. The server may therefore form part of the overall system. To account for such a situation, the steps performed by the control panel 102 in the exemplified embodiments may in more general terms be considered to be performed in a "controller core". In some embodiments, the controller core is a control panel, e.g. control panel 102 of monitoring system 100. In other embodiments the controller core comprises: a server (e.g. server 101) and a control panel (e.g. control panel 102) of a monitoring system (e.g. monitoring system 100), wherein the steps exemplified are implemented on a plurality of processors, which may be distributed amongst the control panel and the server.

Where a given item is referenced herein with the preposition "a" or "an", it is not intended to exclude the possibility of additional instances of such an item, unless context requires otherwise.

Where the specification defines a range, the stated outer extremities of the range are part of the range, unless context requires exclusion of the outer extremities from the range. From example, a range defined in terms of being between X and Y or from X to Y, should be interpreted as including X and Y.

The invention disclosed and defined herein extends to all plausible combinations of two or more of the individual features mentioned or evident from the text or drawings. All of these different combinations constitute various alternative aspects of the invention.

What is claimed is:

1. A computer-implemented method for identifying a location of a person within a building, the method comprising at one or more processors of a monitoring system:

at a control hub of the system, upon receiving a trigger, instructing wireless transmission, to a plurality of sensing devices of the monitoring system at a plurality of locations distributed in a building, of a request for an acoustic indicator generated in the sensing device, wherein each of the sensing devices has at least one sensor for detecting a threat-condition and an acoustic sensor for generating at the sensing device an acoustic indicator indicative of an incident acoustic wave received by the sensing device, the acoustic indicator being a response based on said incident acoustic wave, and the request configures each of the plurality of sensing devices to wake at least one processing device in the sensing device and activate a process in respect of an incident acoustic wave to generate the acoustic indicator using the at least one processing device;

at the control hub, receiving from transmissions by multiple sensing devices of the plurality of sensing devices a respective multiple of said requested acoustic indicators, each acoustic indicator being derived from the activated process;

selecting a subset of the received acoustic indicators, the selecting of the subset comprising comparing the received multiple of said requested acoustic indicators from the multiple sensing devices to identify at least one of the received acoustic indicators that represents a louder acoustic wave, or a louder component or louder acoustic signature extracted from the acoustic wave, than another of the received multiple of said requested acoustic indicators; and based on which one or more sensing devices correspond to the at least one of the received acoustic indicators that represents the louder acoustic wave or the louder component or the louder acoustic signature extracted from the acoustic wave, identifying a location of the person within the building.

2. The computer-implemented method according to claim 1, wherein the method comprises a narrowing of possible locations in which the person may be located based on outcomes of analyses of waves that are incident on the plurality of sensing devices, wherein the analysis of each incident wave comprises determining whether the incident wave passes a test, wherein the identified location excludes locations at which the incident wave fails the test, wherein passing the test requires that a measured loudness of the incident wave, or of a component or acoustic signature extracted from the incident wave, is greater than a predefined threshold for at least one time window of a predefined duration.

3. The computer-implemented method according to claim 1, wherein the method comprises a narrowing of possible locations in which the person may be located based on outcomes of analyses of waves that are incident on the plurality of sensing devices, wherein the analysis of each incident wave comprises determining whether the incident wave passes a test, wherein the identified location excludes locations at which the incident wave fails the test, wherein the analysis comprises analyzing the incident acoustic wave to identify one or more spoken words represented in the acoustic waves, and passing the test requires that the analysis identifies one or more spoken words.

4. The computer-implemented method according to claim 1, wherein the method comprises a narrowing of possible locations in which the person may be located based on outcomes of analyses of waves that are incident on the plurality of sensing devices, wherein the analysis of each incident wave comprises determining whether the incident wave passes a test, wherein the identified location excludes locations at which the incident wave fails the test, wherein the analysis comprises analyzing the incident acoustic wave to identify whether the incident acoustic wave has a characteristic corresponding to a reference acoustic signature, the reference acoustic signature representing a predefined acoustic beacon, wherein passing the test requires that the characteristic corresponds to a reference acoustic signature.

5. The computer-implemented method according to claim 1, wherein a threat alert in a radiofrequency signal received by a wireless communication channel for communicating with a device in the building acts as the trigger.

6. The computer-implemented method according to claim 5, wherein the threat alert is a signal indicative of at least one of: a fall detection event; a voice-activated distress call event; and a distress button press event; and a distress chord pulling event.

7. The computer-implemented method according to claim 5, wherein the threat alert is from a wearable personal safety device worn on the person and configured for one or more of: detecting a fall and receiving a distress response from the person, and the wearable personal safety device in addition to transmitting the threat alert transmits an acoustic beacon for detection by at least one of said sensing devices.

8. The computer-implemented method according to claim 1, wherein a received request from a remote device to identify a location of a person acts as the trigger and the method comprises instructing transmission of the identified location to said remote device.

9. The computer-implemented method according to claim 8, wherein the request from the remote device is received over a telecommunications network.

10. The computer-implemented method according to claim 1, wherein the method comprises, at each of said plurality of sensing devices:
  transmitting, via a speaker, an audible sentence to prompt a person in the vicinity of the sensing device to reply an answer;
  for a predefined time window, acquiring an acoustic signal, using the acoustic sensor and processor, to capture the answer, and transmit the acoustic-indicator based on said acoustic signal.

11. The computer-implemented method according to claim 1, wherein a received request from a remote device to identify a location of a person acts as the trigger and the method comprises instructing transmission of the identified location to said remote device.

12. The computer-implemented method according to claim 11, wherein the request is received via a telecommunications network.

13. The computer-implemented method according to claim 1, wherein the method comprises determining a loudest acoustic indicator, or a set of louder received acoustic indicators, amongst the received responses from the sensing devices in respect of received acoustic indicators comprising a signature.

14. A non-transitory computer readable medium storing a plurality of instructions for controlling an electronic system to perform the method according to claim 1.

15. A system comprising:
a controller core; and
a plurality of sensing devices for operation at a plurality of locations distributed in a building, each of the sensing devices having at least one sensor for detecting a threat-condition and an acoustic sensor for generating in the sensing device an acoustic indicator indicative of an incident acoustic wave;
the controller core being configured for interfacing with the plurality of sensing devices,
the system being configured to, in use, perform the method according to claim 1.

16. A system comprising:
a controller core; and
a plurality of sensing devices for operation at a plurality of locations distributed in a building, each of the sensing devices having at least one sensor for detecting a threat-condition and an acoustic sensor for generating in the sensing device an acoustic indicator indicative of an incident acoustic wave;
the controller core being configured for interfacing with the plurality of sensing devices,
the system being configured to, in use, perform a method for identifying a location of a person within a building, the method comprising at one or more processors of the system, wherein the one or more processors are configured to:
upon receiving a trigger, instruct wireless transmission, to a plurality of sensing devices of the monitoring system at a plurality of locations distributed in a building, of a request for an acoustic indicator generated in the sensing device, wherein each of the sensing devices has at least one sensor for detecting a threat-condition and an acoustic sensor for generating at the sensing device an acoustic indicator indicative of an incident acoustic wave received by the sensing device, the acoustic indicator being a response based on said incident acoustic wave, and the request configures each of the plurality of sensing devices to wake at least one processing device in the sensing device and activate a process in respect of an incident acoustic wave to generate the acoustic indicator using the at least one processing device;
receive from transmissions by multiple sensing devices of the plurality of sensing devices a respective multiple of said requested acoustic indicators, each acoustic indicator being derived from the activated process;
select a subset of the received acoustic indicators, the selecting of the subset comprising comparing the received multiple of said requested acoustic indicators from the multiple sensing devices to identify at least one of the received acoustic indicators that represents a louder acoustic wave, or a louder component or louder acoustic signature extracted from the acoustic wave, than another of the received multiple of said requested acoustic indicators; and
based on which one or more sensing devices correspond to the at least one of the received acoustic indicators that represents the louder acoustic wave or the louder component or the louder acoustic signature extracted from the acoustic wave, identify a location of the person within the building.

* * * * *